United States Patent
Bae

(10) Patent No.: US 9,106,521 B2
(45) Date of Patent: *Aug. 11, 2015

(54) METHOD AND SYSTEM FOR VISUALIZING AN ADAPTIVE SCREEN ACCORDING TO A TERMINAL

(71) Applicant: SK PLANET CO., LTD., Seoul (KR)

(72) Inventor: Tae Meon Bae, Seoul (KR)

(73) Assignee: SK PLANET CO., LTD. (KR)

( * ) Notice: Subject to any disclaimer, the term of this patent is extended or adjusted under 35 U.S.C. 154(b) by 88 days.

This patent is subject to a terminal disclaimer.

(21) Appl. No.: 14/074,922

(22) Filed: Nov. 8, 2013

(65) Prior Publication Data
US 2014/0164605 A1    Jun. 12, 2014

Related U.S. Application Data

(63) Continuation of application No. 13/711,812, filed on Dec. 12, 2012, now Pat. No. 8,671,435.

(51) Int. Cl.
| | |
|---|---|
| *H04N 21/63* | (2011.01) |
| *H04L 29/06* | (2006.01) |
| *H04L 12/26* | (2006.01) |
| *H04M 1/725* | (2006.01) |
| *H04W 4/18* | (2009.01) |
| *H04W 8/24* | (2009.01) |

(52) U.S. Cl.
CPC ............ *H04L 43/065* (2013.01); *H04L 65/608* (2013.01); *H04M 1/72522* (2013.01); *H04N 21/63* (2013.01); *H04W 4/18* (2013.01); *H04W 8/24* (2013.01)

(58) Field of Classification Search
CPC ...... H04N 21/63; H04N 21/65; H04N 21/658; H04L 65/608; H04L 67/10; H04L 43/65; G06F 17/30067; G06F 17/30233
See application file for complete search history.

(56) References Cited

FOREIGN PATENT DOCUMENTS

| | | |
|---|---|---|
| CN | 001538707 | 10/2004 |
| CN | 101378400 | 3/2009 |
| CN | 101420670 | 4/2009 |
| CN | 101770477 | 7/2010 |
| CN | 201571083 | 9/2010 |
| WO | 2009-128528 | 10/2009 |

*Primary Examiner* — Hai V Tran
(74) *Attorney, Agent, or Firm* — Baker Hostetler LLP

(57) ABSTRACT

The present invention relates to a user terminal, cloud device and virtualization method in which a user terminal transmits a system profile to a cloud apparatus for generating a list of candidate screen visualization techniques from system profile information transmitted from the terminal, checks an apparatus loading amount and processing possibility for each technique, and determines an optimal screen visualization technique candidate on the basis of an available resource of an apparatus and a system profile of a terminal according to web service possibility and video streaming processing possibility. The system profile information includes web browser performance, video streaming replay function, RDP and VNC client driving possibility, network status, resolution and requesting service. The cloud apparatus receives the system profile information from the user terminal, generates a list of candidate screen visualization techniques, checks an apparatus loading amount and processing possibility to determine a screen visualization technique.

14 Claims, 4 Drawing Sheets

METHOD AND SYSTEM FOR VISUALIZING AN ADAPTIVE SCREEN ACCORDING TO A TERMINAL

This application is a continuation of application Ser. No. 13/711,812 filed on Dec. 12, 2012.

TECHNICAL FIELD

The present invention relates to a method and system for providing a presentation virtualization service to various terminals requesting the corresponding service and, more particularly, to a method and system for device-adaptive presentation virtualization, in which when a user terminal transmits a system profile to a cloud device, the cloud device generates a list of candidate presentation virtualization technologies, which can be processed by the terminal, from the system profile transmitted from the terminal, determines a device load and the possibility of processing for each technology, and determines, through a presentation virtualization technology determination unit, an optimal presentation virtualization technology candidate on the basis of the system profile of the terminal and available resources of the cloud device based on whether a web service is available, whether Remote Desktop Protocol (RDP)/Virtual Network Computing (VNC) is available, and whether video streaming is available, thus expanding the number of users and the types of terminals which can be processed by the server.

BACKGROUND ART

As cloud-based services have recently been emerged, technology which allows a service or application to be driven by a cloud device and the results to be received by a terminal is required. In particular, a presentation virtualization technology which allows only service screen and audio are driven by the terminal is required as a key technology.

Virtual network computing (VNC) technology developed by AT&T and remote desktop protocol (RDP)-based remote desktop service developed by Microsoft are the most typical technologies. These technologies are based on compression and transmission of changed screen area.

As another presentation virtualization technology, a compression method which utilizes a video compression technology is proposed. This method is used as a presentation virtualization technology for a cloud-based game service.

Lastly, a web-based technology is used as a client technology of a virtualization server including presentation virtualization. According to the web-based presentation virtualization, when the result of an application or service driven by a server is provided to a terminal in the form of a web page, the terminal consumes the service through a web service, and the web-based presentation virtualization is widely used as new technology standards such as HTML 5, etc. emerge.

However, the web-based presentation virtualization may have limitations in the presentation virtualization function according to whether the terminal can support all functions of a web browser. At present, the web browser supporting all functions including flash, video, etc. can be driven by a terminal having a high-performance CPU. An RDP or VNC-based image compression-based presentation virtualization technology can operate in a terminal having a relatively low-performance CPU but is difficult to operate in a low-performance set top box, cellular phone, etc., which is problematic.

Meanwhile, while video compression-based presentation virtualization requires the terminal to have the highest computational complexity, most video encodings are processed by the terminal in a hardware manner, and thus the video compression-based presentation virtualization can operate even in a set top box, cellular phone, etc. with a low CPU performance at present. However, the video compression technology-based presentation virtualization requires the server to have a high computational complexity for the video compression and the cost of service increases, which is problematic.

DISCLOSURE

Technical Problem

Accordingly, the present invention has been made to solve the above-described problems, and an object of the present invention is to provide a method and system for device-adaptive presentation virtualization, in which when a user terminal transmits a system profile to a server, the server generates a list of candidate presentation virtualization technologies, which can be processed by the terminal, from the system profile transmitted from the terminal, determines a device load and the possibility of processing for each technology, and determines, through a presentation virtualization technology determination unit, an optimal presentation virtualization technology candidate on the basis of the system profile of the terminal and available resources of the server based on whether a web service is available, whether Remote Desktop Protocol (RDP)/Virtual Network Computing (VNC) is available, and whether video streaming is available, thus expanding the number of users and the types of terminals which can be processed by the server.

Technical Solution

According to an aspect of the present invention to achieve the above objects, there is provided a device-adaptive presentation virtualization system comprising: a user terminal which transmits system profile information comprising the performance of a web browser, a video streaming playback function, the availability of Remote Desktop Protocol (RDP)/Virtual Network Computing (VNC) client, a network status, a resolution, and a request service to a cloud device through a communication network and receives a presentation virtualization service based on the system profile information from the cloud device; and the cloud device which generates a list of candidate presentation virtualization technologies, which can be processed by the terminal, from the system profile information transmitted from the user terminal through the communication network, determines a device load and the possibility of processing for each technology, determines a presentation virtualization technology based on the device load and the possibility of processing for each technology, and provides a presentation virtualization service to the user terminal through the determined presentation virtualization technology.

According to another aspect of the present invention to achieve the above objects, there is provided a cloud device comprising: a communication unit which communicates with a user terminal through a communication network; a profile analysis unit which, when receiving system profile information from the user terminal, generates a list of candidate presentation virtualization technologies, which can be processed by the user terminal, from the system profile information; a device capacity analysis unit which determines a device load and the possibility of processing for each technology of the list of candidate presentation virtualization technologies; a presentation virtualization technology determination unit which determines a final presentation virtualization technology based on the device load and the possibility of processing for each technology of the list of candidate presentation virtualization technologies; and a control unit which, when the final presentation virtualization technology is determined based on the system profile information received from the user terminal, provides a presentation virtualization service to the user terminal through the final presentation virtualization technology.

The profile analysis unit may determine whether full browsing, Remote Desktop Protocol (RDP)/Virtual Network Computing (VNC), and video streaming are available, respectively, and register an available function in the list of candidate presentation virtualization technologies.

The profile analysis unit may register the video streaming in the list of candidate presentation virtualization technologies if the user terminal supports at least one codec and streaming protocol for audio and video and if an average transfer rate of the network is greater than a predetermined bitrate based on a resolution of the user terminal and an available video/audio codec.

The presentation virtualization technology determination unit may determine, based on the device load and the possibility of processing for each technology of the list of candidate presentation virtualization technologies, that the presentation virtualization technology can be provided through a web service if the web service is available, determine whether the presentation virtualization technology can be processed through the RDP/VNC if the web service is unavailable, determine to process the presentation virtualization technology trough the video streaming if it is impossible to process the presentation virtualization technology through the RDP/VNC, and determine to process the presentation virtualization technology through the RDP/VNC if the video streaming is unavailable due to a CPU's load.

The device capacity analysis unit may determine, based on the system profile information, that a request service can be provided through a web browser if the request service can be supported through a web service and if the user terminal can support full browsing, determine that the request service cannot be processed through the RDP/VNC if a video is included in the request service, determine that the request service cannot be processed through the RDP/VNC if the average transfer rate of the network is lower than a predetermined data transfer rate required by the RDP/VNC for each predetermined terminal resolution, and determine an increasing CPU load if the server displays a screen by video encoding in the case of the video streaming.

The control unit may provide the presentation virtualization service to the user terminal through a web if it is determined that the final presentation virtualization technology can be provided through a web service, provide the presentation virtualization service through the RDP/VNC if the user terminal supports the RDP/VNC and if it is determined that the final presentation virtualization technology can be supported by the RDP/VNC, and provide the presentation virtualization service through the video streaming if it is determined that the final presentation virtualization technology can be provided through the video streaming and if the CPU load is less than a critical value.

According to still another aspect of the present invention to achieve the above objects, there is provided a user terminal comprising: a communication unit which communicates with a cloud device; a profile management unit which manages system profile information to be transmitted to the cloud device; a control unit which transmits the system profile information to the cloud device, receives data related to a presentation virtualization service through a final presentation virtualization technology determined based on the system profile information from the cloud device, and outputs the received data; and an output unit which outputs the data related to the presentation virtualization service, received from the cloud device, on a screen or as sound.

The system profile information may comprise the performance of a web browser, a video streaming playback function, the availability of Remote Desktop Protocol (RDP)/Virtual Network Computing (VNC) client, a network status, resolution information, and a request service.

The performance of the web browser may be determined based on the availability of full browsing, which indicates whether a web page on the Internet can be displayed without problem, the availability of RDP/VNC client may be determined based on whether the RDP/VNC client can operate, the video streaming playback function may comprise a codec list and a streaming protocol which are installed in the terminal, the network status may comprise the type of network and an average transfer rate, and the request service may comprise a service or application requested by a user.

According to yet another aspect of the present invention to achieve the above objects, there is provided a device adaptive presentation virtualization method implemented by a system in which a user terminal and a cloud device communicate with each other through a communication network, the method comprising: (a) transmitting, at the user terminal, system profile information comprising the performance of a web browser, a video streaming playback function, the availability of Remote Desktop Protocol (RDP)/Virtual Network Computing (VNC) client, a network status, a resolution, and a request service to the cloud device; (b) generating, at the cloud device, a list of candidate presentation virtualization technologies, which can be processed by the terminal, from the system profile information; (c) determining, at the cloud device, a device load and the possibility of processing for each technology of the list of candidate presentation virtualization technologies; (d) determining, at the cloud device, a presentation virtualization technology based on the device load and the possibility of processing for each technology; and (e) providing, at the cloud device, a presentation virtualization service to the user terminal through the determined presentation virtualization technology.

According to still yet another aspect of the present invention to achieve the above objects, there is provided a device-adaptive presentation virtualization method implemented by a cloud device which communicates with a user terminal through a communication network, the method comprising: (a) receiving system profile information from the user terminal; (b) generating a list of candidate presentation virtualization technologies, which can be processed by the terminal, from the system profile information; (c) determining a device load and the possibility of processing for each technology of the list of candidate presentation virtualization technologies; (d) determining a presentation virtualization technology based on the device load and the possibility of processing for each technology of the list of candidate presentation virtualization technologies; and (e) providing a presentation virtualization service to the user terminal through the determined presentation virtualization technology.

Step (b) may comprise determining whether full browsing, Remote Desktop Protocol (RDP)/Virtual Network Computing (VNC), and video streaming are available, respectively, and registering an available function in the list of candidate presentation virtualization technologies.

Step (b) may comprise registering the video streaming in the list of candidate presentation virtualization technologies if the user terminal supports at least one codec and streaming protocol for audio and video and if an average transfer rate of the network is greater than a predetermined bitrate based on a resolution of the user terminal and an available video/audio codec.

Step (d) may comprise determining, based on the device load and the possibility of processing for each technology of the list of candidate presentation virtualization technologies, that the presentation virtualization technology can be provided through a web service if the web service is available, determining whether the presentation virtualization technology can be processed through the RDP/VNC if the web service (is unavailable, determining to process the presentation virtualization technology trough the video streaming if it is impossible to process the presentation virtualization technology through the RDP/VNC, and determining to process the presentation virtualization technology through the RDP/VNC if the video streaming is unavailable due to a CPU's load.

Step (c) may comprise determining, based on the system profile information, that a request service can be provided through a web browser if the request service can be supported through a web service and if the user terminal can support full browsing, determining that the request service cannot be processed through the RDP/VNC if a video is included in the request service, determining that the request service cannot be processed through the RDP/VNC if the average transfer rate of the network is lower than a predetermined data transfer rate required by the RDP/VNC for each predetermined terminal resolution, and determining an increasing CPU load if the server displays a screen by video encoding in the case of the video streaming.

Step (e) may comprise providing the presentation virtualization service to the user terminal through a web if it is determined that the final presentation virtualization technology can be provided through a web service, providing the presentation virtualization service through the RDP/VNC if the user terminal supports the RDP/VNC and if it is determined that the final presentation virtualization technology can be supported by the RDP/VNC, and providing the presentation virtualization service through the video streaming if it is determined that the final presentation virtualization technology can be provided through the video streaming and if the CPU load is less than a critical value.

According to a further aspect of the present invention to achieve the above objects, there is provided a device-adaptive presentation virtualization method implemented by a user terminal which communicates with a cloud device through a communication network, the method comprising: (a) transmitting system profile information to the cloud device; (b) receiving data related to a presentation virtualization service through a final presentation virtualization technology determined based on the system profile information from the cloud device; and (c) outputting the data related to the presentation virtualization service, received from the cloud device, on a screen or as sound.

The system profile information may comprise the performance of a web browser, a video streaming playback function, the availability of Remote Desktop Protocol (RDP)/Virtual Network Computing (VNC) client, a network status, resolution information, and a request service.

The performance of the web browser may be determined based on the availability of full browsing, which indicates whether a web page on the Internet can be displayed without problem, the availability of RDP/VNC client may be determined based on whether the RDP/VNC client can operate, the video streaming playback function may comprise a codec list and a streaming protocol which are installed in the terminal, the network status may comprise the type of network and an average transfer rate, and the request service may comprise a service or application requested by a user.

Advantageous Effects

According to the present invention, the RDP or VNC-based image compression-based presentation virtualization technology, which can operate in a terminal having a relatively low-performance CPU, can operate even in a low-performance set top box, cellular phone, etc.

Moreover, it is possible to implement a video compression-based presentation virtualization technology which requires a server to have a high computational complexity for the video compression, and the cloud device can adaptively provide an optimal presentation virtualization technology based on the performance of the terminal and the server.

Furthermore, it is possible to determine an optimal presentation virtualization technology candidate on the basis of the system profile of the terminal and available resources of the server, thus expanding the number of users and the types of terminals which can be processed by the server.

MODE FOR INVENTION

Details of the foregoing objects, technical construction and corresponding operational effects of the present invention will be more clearly understood by the following detailed descriptions based on the drawings attached to the specification of the present invention. Hereinafter, embodiments of the present invention will be described in detail with reference to the accompanying drawings.

Figure 1:
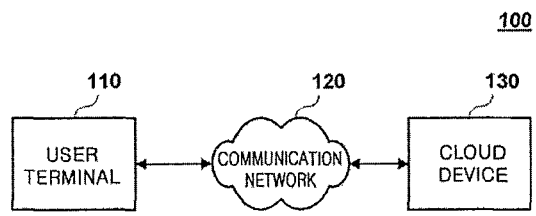
FIG. 1 is a diagram showing the entire configuration of a device-adaptive presentation virtualization system in accordance with an embodiment of the present invention.

FIG. 1 is a diagram showing the entire configuration of a device-adaptive presentation virtualization system in accordance with an embodiment of the present invention.

Referring to FIG. 1, a device-adaptive presentation virtualization system 100 according to the present invention comprises a user terminal 110, a communication network 120, and a cloud device 130.

The user terminal 110 transmits system profile information including the performance of a web browser, a video streaming playback function, the availability of Remote Desktop Protocol (RDP)/Virtual Network Computing (VNC) client, a network status, a resolution, and a request service to the cloud device 130 through the communication network 120 and receives a presentation virtualization service based on the system profile information from the cloud device 130.

The user terminal 110 may be a mobile terminal such as a cellular phone, PDA, smart phone, etc. when the communication network 120 is a mobile communication network and may be a computer terminal, for example, when the communication network 120 is a wired communication network such as Internet, PSTN, etc.

The communication network 120 may comprise a mobile communication network such as CDMA, WCDMA, HSPA, etc., a wired communication network such as Internet, PSTN, etc., and a local area network such as Bluetooth, Zigbee, etc.

When receiving the system profile information from the user terminal 110 through the communication network 120, the cloud device 130 generates a list of candidate presentation virtualization technologies, which can be processed by the user terminal 110, from the system profile, determines a presentation virtualization technology by determining a device load and the possibility of processing for each technology, and provides a presentation virtualization service to the user terminal 110 through the determined presentation virtualization technology.

Figure 2:
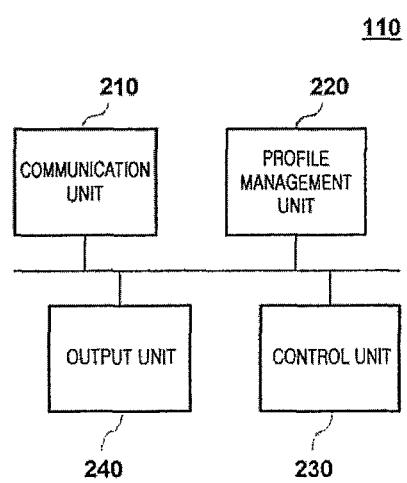
FIG. 2 is a diagram showing the configuration of functional blocks of a user terminal in accordance with an embodiment of the present invention.

FIG. 2 is a diagram showing the configuration of functional blocks of the user terminal in accordance with an embodiment of the present invention.

Referring to FIG. 2, the user terminal 110 according to the present invention comprises a communication unit 210, a profile management unit 220, a control unit 230, and an output unit 240.

Here, the user terminal 110 may further comprise a memory for storing data.

The communication unit 210 communicates with the cloud device 130 through the communication network 120.

The profile management unit 220 manages the system profile information to be transmitted to the cloud device 130.

Here, the system profile information may comprise the performance of a web browser, a video streaming playback function, the availability of Remote Desktop Protocol (RDP)/Virtual Network Computing (VNC) client, a network status, resolution information, a request service, etc.

Here, the performance of the web browser may be determined based on the availability of full browsing, which indicates whether a web page on the Internet can be displayed without problem, the availability of RDP/VNC client may be determined based on whether the RDP/VNC client can operate, the video streaming playback function may comprise a codec list and a streaming protocol which are installed in the terminal, the network status may comprise the type of network and an average transfer rate, and the request service may comprise a service or application requested by a user.

The control unit 230 transmits the system profile information to the cloud device 130, receives data related to the presentation virtualization service through a final presentation virtualization technology determined based on the system profile information from the cloud device 130, and outputs the received data.

The output unit 240 outputs the data related to the presentation virtualization service, received from the cloud device 130, on a screen or as sound. Accordingly, the output unit 240 may comprise a display unit for displaying the data related to the presentation virtualization service on a screen and a sound output unit for outputting the data related to the presentation virtualization service as sound.

Figure 3:
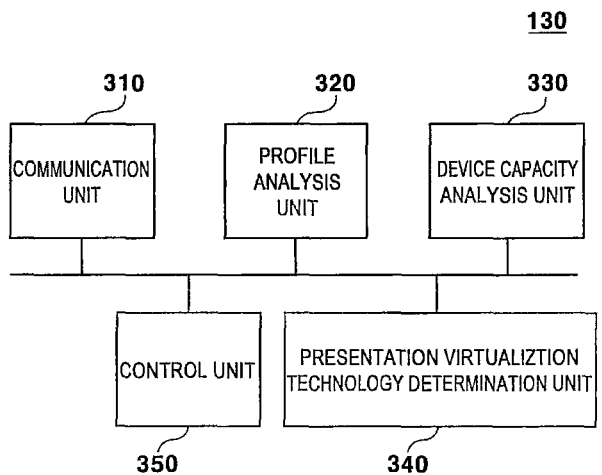
FIG. 3 is a diagram showing the configuration of functional blocks of a cloud device in accordance with an embodiment of the present invention.

FIG. 3 is a diagram showing the configuration of functional blocks of the cloud device in accordance with an embodiment of the present invention.

Referring to FIG. 3, the cloud device 130 according to the present invention comprises a communication unit 310, a profile analysis unit 320, a device capacity analysis unit 330, a presentation virtualization technology determination unit 340, and a control unit 350.

The communication unit 310 communicates with the user terminal 110 through the communication network 120.

When receiving the system profile information from the user terminal 110 through the communication network 120, the profile analysis unit 320 generates a list of candidate presentation virtualization technologies, which can be processed by the user terminal 110, from the system profile.

Moreover, the profile analysis unit 320 may determine whether the full browsing, the Remote Desktop Protocol (RDP)/Virtual Network Computing (VNC), and the video streaming are available, respectively, and register an available function in the list of candidate presentation virtualization technologies.

Furthermore, the profile analysis unit 320 may register the video streaming in the list of candidate presentation virtualization technologies if the user terminal 110 supports at least one codec and streaming protocol and if the average transfer rate of the network is greater than a predetermined bitrate based on the resolution of the terminal and the available video/audio codec.

The device capacity analysis unit 330 determines a device load and the possibility of processing for each technology of the list of candidate presentation virtualization technologies.

Moreover, the device capacity analysis unit 330 may determine, based on the system profile information, that the request service can be provided through a web browser if the request service can be supported through a web service and if the user terminal 110 can support full browsing, determine that the request service cannot be processed through the RDP/VNC if a video is included in the request service, determine that the request service cannot be processed through the RDP/VNC if the average transfer rate of the network is lower than a predetermined data transfer rate required by the RDP/VNC for each predetermined terminal resolution, and determine an increasing CPU load if the server displays a screen by video encoding in the case of the video streaming.

The presentation virtualization technology determination unit 340 determines a final presentation virtualization technology based on the device load and the possibility of processing for each technology of the list of candidate presentation virtualization technologies.

Moreover, the presentation virtualization technology determination unit 340 may determine, based on the device load and the possibility of processing for each technology of the list of candidate presentation virtualization technologies, that the presentation virtualization technology can be provided through a web service if the web service is available, determine whether the presentation virtualization technology can be processed through the RDP/VNC if the web service is unavailable, determine to process the presentation virtualization technology trough the video streaming if it is impossible to process the presentation virtualization technology through the RDP/VNC, and determine to process the presentation virtualization technology through the RDP/VNC if the video streaming is unavailable due to a CPU's load.

If the final presentation virtualization technology is determined based on the system profile information received from the user terminal 110, the control unit 350 provides the presentation virtualization service to the user terminal 110 through the final presentation virtualization technology.

Moreover, the control unit 350 may provide the presentation virtualization service to the user terminal through a web if it is determined that the final presentation virtualization technology can be provided through a web service, provide the presentation virtualization service through the RDP/VNC if the user terminal supports the RDP/VNC and if it is determined that the final presentation virtualization technology can be supported by the RDP/VNC, and provide the presentation virtualization service through the video streaming if it is determined that the final presentation virtualization technology can be provided through the video streaming and if the CPU load is less than a critical value.

Meanwhile, the cloud device 130 having the above-described configuration may be implemented as a server or implemented as another user terminal.

Figure 4:
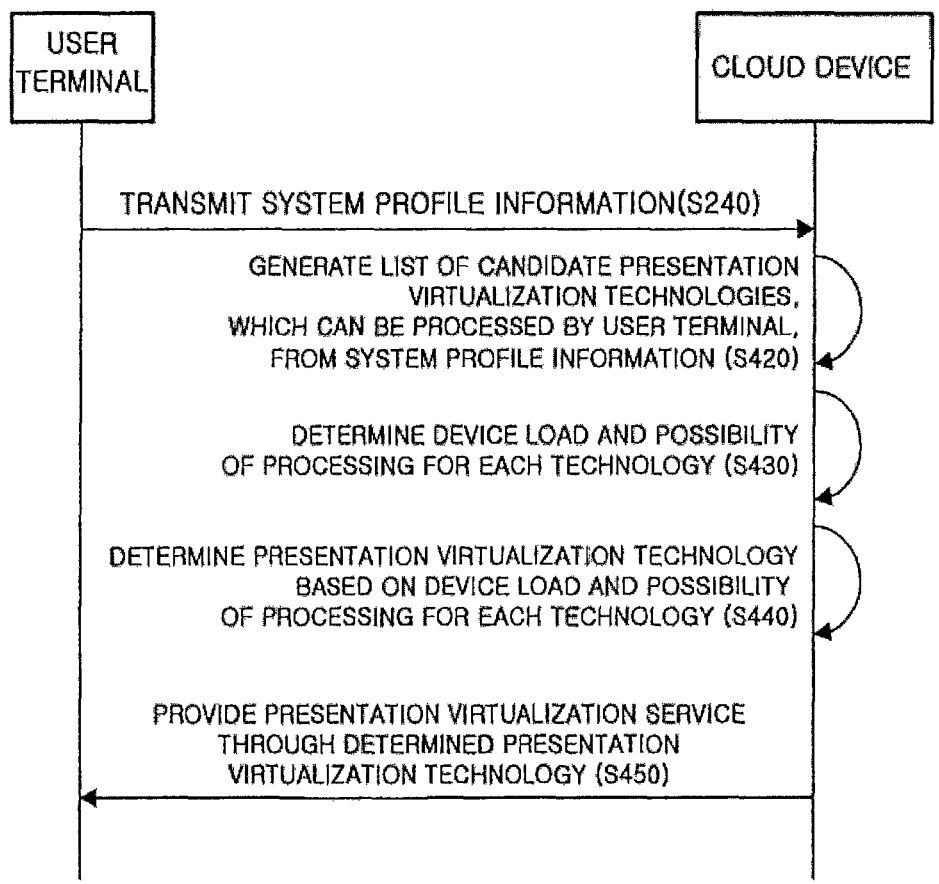
FIG. 4 is an overall flowchart illustrating a device-adaptive presentation virtualization method in accordance with an embodiment of the present invention.

FIG. 4 is an overall flowchart illustrating a device-adaptive presentation virtualization method in accordance with an embodiment of the present invention.

Referring to FIG. 4, first, a user terminal 110 transmits system profile information including the performance of a web browser, a video streaming playback function, the availability of Remote Desktop Protocol (RDP)/Virtual Network Computing (VNC) client, a network status, a resolution, and a request service to a cloud device 130 through a communication network 120 (S410).

Then, the cloud device 130 generates a list of candidate presentation virtualization technologies, which can be processed by the user terminal 110, from the system profile information (S420).

Subsequently, the cloud device 130 determines a device load and the possibility of processing for each technology of the list of candidate presentation virtualization technologies (S430).

Then, the cloud device 130 determines a presentation virtualization technology based on the device load and the possibility of processing for each technology (S440).

Moreover, the cloud device 130 provides a presentation virtualization service to the user terminal 110 through the determined presentation virtualization technology (S450).

Figure 5:
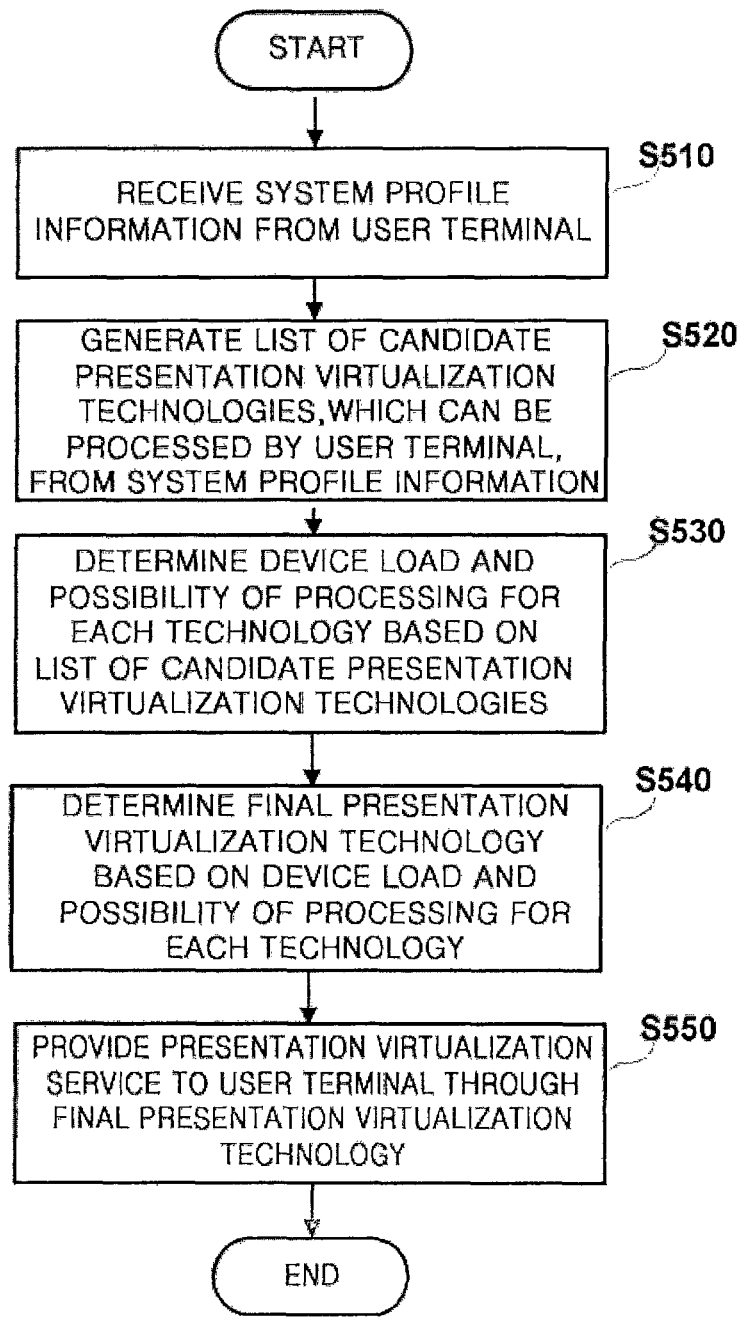
FIG. 5 is a flowchart illustrating the operation of a device-adaptive presentation virtualization method implemented by a cloud device in accordance with an embodiment of the present invention.

FIG. 5 is a flowchart illustrating the operation of a device-adaptive presentation virtualization method implemented by the cloud device in accordance with an embodiment of the present invention.

Referring to FIG. 5, the cloud device 130 according to the present invention receives the system profile information from the user terminal 110 (S510).

Then, the cloud device 130 generates a list of candidate presentation virtualization technologies, which can be processed by the user terminal 110, from the system profile information through a profile analysis unit 320 (S520).

Here, the cloud device 130 may determine whether the full browsing, the Remote Desktop Protocol (RDP)/Virtual Network Computing (VNC), and the video streaming are available, respectively, and register an available function in the list of candidate presentation virtualization technologies.

Moreover, the cloud device 130 may register the video streaming in the list of candidate presentation virtualization technologies if the user terminal 110 supports at least one codec and streaming protocol and if the average transfer rate of the network is greater than a predetermined bitrate based on the resolution of the terminal and the available video/audio codec. For example, the cloud device 130 may determine that the video streaming is available if the user terminal 110 supports H.264, AAC codec, and RTP streaming protocol, if the screen resolution is 800*480, and if the average transfer rate is greater than 1 Mbps. The cloud device 130 may determine that the video streaming is unavailable if the average transfer rate is less than 1 Mbps.

Subsequently, the cloud device 130 determines a device load and the possibility of processing for each technology of the list of candidate presentation virtualization technologies (S530).

Here, the cloud device 130 determines, based on the system profile information, that a request service can be provided through a web browser if the request service can be supported through a web service and if the user terminal 110 can support full browsing. Moreover, the cloud device 130 determines that the request service cannot be processed through the RDP/VNC if a video is included in the request service. Furthermore, the cloud device 130 determines that the request service cannot be processed through the RDP/VNC if the average transfer rate of the network is lower than a predetermined data transfer rate required by the RDP/VNC for each predetermined terminal resolution. In addition, the cloud device 130 determines an increasing CPU load if the server displays a screen by video encoding in the case of the video streaming.

Then, the cloud device 130 determines a final presentation virtualization technology based on the device load and the possibility of processing for each technology of the list of candidate presentation virtualization technologies (S540).

Here, the cloud device 130 may determine, based on the device load and the possibility of processing for each technology of the list of candidate presentation virtualization technologies, that the presentation virtualization technology can be provided through a web service if the web service is available, determine whether the presentation virtualization technology can be processed through the RDP/VNC if the web service is unavailable, determine to process the presentation virtualization technology trough the video streaming if it is impossible to process the presentation virtualization technology through the RDP/VNC, and determine to process the presentation virtualization technology through the RDP/VNC if the video streaming is unavailable due to a CPU's load.

Subsequently, the cloud device 130 provides a presentation virtualization service to the user terminal 110 through the final presentation virtualization technology (S550).

Here, the cloud device 130 may provide the presentation virtualization service to the user terminal through a web if it is determined that the final presentation virtualization technology can be provided through a web service, provide the presentation virtualization service through the RDP/VNC if the user terminal supports the RDP/VNC and if it is determined that the final presentation virtualization technology can be supported by the RDP/VNC, and provide the presentation virtualization service through the video streaming if it is determined that the final presentation virtualization technology can be provided through the video streaming and if the CPU load is less than a critical value.

However, the cloud device 130 may notify the user terminal 110 that the service cannot be provided, except for the above-described web service, RDP/VNC, video streaming, etc.

Figure 6:
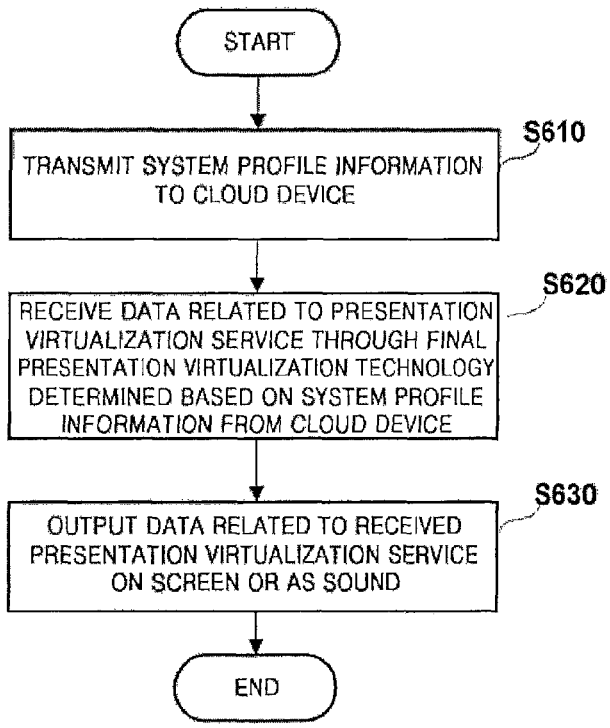
FIG. 6 is a flowchart illustrating the operation of a device-adaptive presentation virtualization method implemented by a user terminal in accordance with an embodiment of the present invention.

FIG. 6 is a flowchart illustrating the operation of a device-adaptive presentation virtualization method implemented by the user terminal in accordance with an embodiment of the present invention.

Figure 7:
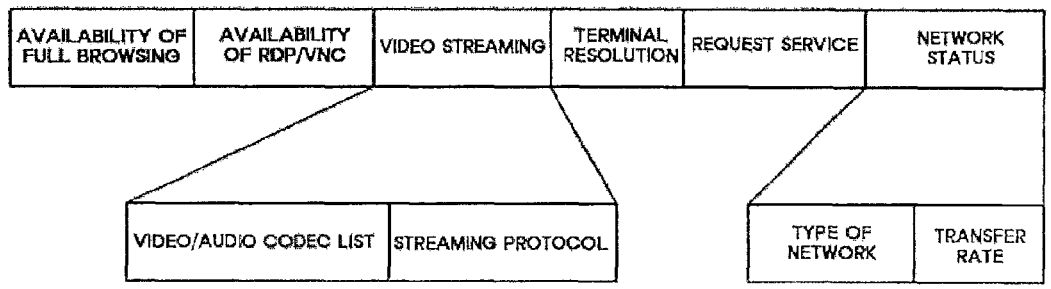
FIG. 7 is a diagram showing the configuration of a transmission frame of system profile information transmitted from a user terminal to a cloud device.

Referring to FIG. 6, the user terminal 110 according to the present invention transmits system profile information as shown in FIG. 7 to the cloud device 130 (S610). FIG. 7 is a diagram showing the configuration of a transmission frame of the system profile information transmitted from the user terminal to the cloud device. As shown in FIG. 7, the system profile information may comprise the performance of a web browser such as the availability of full browsing, the availability of RDP/VNC, which indicates whether the RDP or VNC client can operate, a video streaming playback function such as a codec list and a streaming protocol which are installed in the terminal, a terminal resolution, a request service such as a service or application requested by a user, and a network status such as the type of network and an average transfer rate.

Accordingly, the cloud device 130 may determine the performance of the web browser based on the availability of full browsing, which indicates whether a web page on the Internet can be displayed without problem, determine the availability of RDP/VNC client based on whether the RDP/VNC client can operate, determine the video streaming playback function based on the codec list and the streaming protocol which are installed in the terminal, determine the network status based on the type of network and the average transfer rate, and determine the request service based on the service or application requested by the user.

Then, the user terminal 110 receives data related to the presentation virtualization service through the final presentation virtualization technology determined based on the system profile information from the cloud device 130 (S620).

Moreover, the user terminal 110 outputs the data related to the presentation virtualization service, received from the cloud device 130, on a screen or as sound (S630).

As described above, according to the present invention, when the user terminal transmits the system profile to the server, the server generates the list of candidate presentation virtualization technologies, which can be processed by the terminal, from the system profile transmitted from the terminal, determines the device load and the possibility of processing for each technology, and determines, through the presentation virtualization technology determination unit, an optimal presentation virtualization technology candidate on the basis of the system profile of the terminal and available resources of the server based on whether a web service is available, whether the RDP/VNC is available, and whether the video streaming is available, thus expanding the number of users and the types of terminals which can be processed by the server.

While the embodiments of the present invention has been described in detail with reference to the drawings, it will be understood by those skilled in the art that the invention can be implemented in other specific forms without changing the technical spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

INDUSTRIAL APPLICABILITY

The present invention can be applied to clouding computing-based presentation virtualization systems and also applied to presentation virtualization-related technologies which can provide cloud-based services regardless of wired and wireless communication networks.

The invention claimed is:

1. A cloud device comprising:
a communication unit which communicates with a user terminal through a communication network;
a profile analysis unit which, when receiving system profile information from the user terminal, generates a list of candidate presentation virtualization technologies, which can be processed by the user terminal, from the system profile information;
a device capacity analysis unit which determines a device load and the possibility of processing for each technology of the list of candidate presentation virtualization technologies;
a presentation virtualization technology determination unit which determines a final presentation virtualization technology based on the device load and the possibility of processing for each technology of the list of candidate presentation virtualization technologies;
a control unit which, when the final presentation virtualization technology is determined based on the system profile information received from the user terminal, provides a presentation virtualization service to the user terminal through the final presentation virtualization technology; and
wherein the profile analysis unit determines whether full browsing, Remote Desktop Protocol (RDP)/Virtual Network Computing (VNC), and video streaming are available, respectively, and registers an available function in the list of candidate presentation virtualization technologies.

2. The cloud device of claim 1, wherein the profile analysis unit registers the video streaming in the list of candidate presentation virtualization technologies if the user terminal supports at least one codec and streaming protocol for audio and video and if an average transfer rate of the network is greater than a predetermined bitrate based on a resolution of the user terminal and an available video/audio codec.

3. The cloud device of claim 1, wherein the presentation virtualization technology determination unit determines, based on the device load and the possibility of processing for each technology of the list of candidate presentation virtualization technologies, that the presentation virtualization technology can be provided through a web service if the web service is available, determines whether the presentation virtualization technology can be processed through the RDP/VNC if the web service is unavailable, determines to process the presentation virtualization technology trough the video streaming if it is impossible to process the presentation virtualization technology through the RDP/VNC, and determines to process the presentation virtualization technology through the RDP/VNC if the video streaming is unavailable due to a CPU's load.

4. The cloud device of claim 1, wherein the device capacity analysis unit determines, based on the system profile information, that a request service can be provided through a web browser if the request service can be supported through a web service and if the user terminal can support full browsing, determines that the request service cannot be processed through the RDP/VNC if a video is included in the request service, determines that the request service cannot be processed through the RDP/VNC if the average transfer rate of the network is lower than a predetermined data transfer rate required by the RDP/VNC for each predetermined terminal resolution, and determines an increasing CPU load if the server displays a screen by video encoding in the case of the video streaming.

5. The cloud device of claim 1, wherein the control unit provides the presentation virtualization service to the user terminal through a web if it is determined that the final presentation virtualization technology can be provided through a web service, provides the presentation virtualization service through the RDP/VNC if the user terminal supports the RDP/VNC and if it is determined that the final presentation virtualization technology can be supported by the RDP/VNC, and provides the presentation virtualization service through the video streaming if it is determined that the final presentation virtualization technology can be provided through the video streaming and if the CPU load is less than a critical value.

6. A user terminal comprising:
   a communication unit which communicates with a cloud device;
   a profile management unit which manages system profile information to be transmitted to the cloud device;
   a control unit which transmits the system profile information to the cloud device, receives data related to a presentation virtualization service through a final presentation virtualization technology determined based on the system profile information from the cloud device, and outputs the received data;
   an output unit which outputs the data related to the presentation virtualization service, received from the cloud device, on a screen or as sound; and
   wherein the system profile information comprises the performance of a web browser, a video streaming playback function, the availability of Remote Desktop Protocol (RDP)/Virtual Network Computing (VNC) client, a network status, resolution information, and a request service.

7. The user terminal of claim 6, wherein the performance of the web browser is determined based on the availability of full browsing, which indicates whether a web page on the Internet can be displayed without problem, the availability of RDP/VNC client is determined based on whether the RDP/VNC client can operate, the video streaming playback function comprises a codec list and a streaming protocol which are installed in the terminal, the network status comprises the type of network and an average transfer rate, and the request service comprises a service or application requested by a user.

8. A device-adaptive presentation virtualization method implemented by a cloud device which communicates with a user terminal through a communication network, the method comprising:
   (a) receiving system profile information from the user terminal;
   (b) generating a list of candidate presentation virtualization technologies, which can be processed by the terminal, from the system profile information;
   (c) determining a device load and the possibility of processing for each technology of the list of candidate presentation virtualization technologies;
   (d) determining a presentation virtualization technology based on the device load and the possibility of processing for each technology of the list of candidate presentation virtualization technologies;
   (e) providing a presentation virtualization service to the user terminal through the determined presentation virtualization technology; and
   wherein step (b) comprises determining whether full browsing, Remote Desktop Protocol (RDP)/Virtual Network Computing (VNC), and video streaming are available, respectively, and registering an available function in the list of candidate presentation virtualization technologies.

9. The method of claim 8, wherein step (b) comprises registering the video streaming in the list of candidate presentation virtualization technologies if the user terminal supports at least one codec and streaming protocol for audio and video and if an average transfer rate of the network is greater than a predetermined bitrate based on a resolution of the user terminal and an available video/audio codec.

10. The method of claim 8, wherein step (d) comprises determining, based on the device load and the possibility of processing for each technology of the list of candidate presentation virtualization technologies, that the presentation virtualization technology can be provided through a web service if the web service is available, determining whether the presentation virtualization technology can be processed through the RDP/VNC if the web service is unavailable, determining to process the presentation virtualization technology trough the video streaming if it is impossible to process the presentation virtualization technology through the RDP/VNC, and determining to process the presentation virtualization technology through the RDP/VNC if the video streaming is unavailable due to a CPU's load.

11. The method of claim 8, wherein step (c) comprises determining, based on the system profile information, that a request service can be provided through a web browser if the request service can be supported through a web service and if the user terminal can support full browsing, determining that the request service cannot be processed through the RDP/VNC if a video is included in the request service, determining that the request service cannot be processed through the RDP/VNC if the average transfer rate of the network is lower than a predetermined data transfer rate required by the RDP/VNC for each predetermined terminal resolution, and determining an increasing CPU load if the server displays a screen by video encoding in the case of the video streaming.

12. The method of claim 8, wherein step (e) comprises providing the presentation virtualization service to the user terminal through a web if it is determined that the final presentation virtualization technology can be provided through a web service, providing the presentation virtualization service through the RDP/VNC if the user terminal supports the RDP/VNC and if it is determined that the final presentation virtualization technology can be supported by the RDP/VNC, and providing the presentation virtualization service through the video streaming if it is determined that the final presentation virtualization technology can be provided through the video streaming and if the CPU load is less than a critical value.

13. A device-adaptive presentation virtualization method implemented by a user terminal which communicates with a cloud device through a communication network, the method comprising:
   (a) transmitting system profile information to the cloud device;
   (b) receiving data related to a presentation virtualization service through a final presentation virtualization technology determined based on the system profile information from the cloud device;
   (c) outputting the data related to the presentation virtualization service, received from the cloud device, on a screen or as sound; and
   wherein the system profile information comprises the performance of a web browser, a video streaming playback function, the availability of Remote Desktop Protocol (RDP)/Virtual Network Computing (VNC) client, a network status, resolution information, and a request service.

14. The method of claim 13, wherein the performance of the web browser is determined based on the availability of full browsing, which indicates whether a web page on the Internet can be displayed without problem, the availability of RDP/VNC client is determined based on whether the RDP/VNC client can operate, the video streaming playback function comprises a codec list and a streaming protocol which are installed in the terminal, the network status comprises the type of network and an average transfer rate, and the request service comprises a service or application requested by a user.

* * * * *